(No Model.)

J. L. YOST.
BICYCLE WHEEL.

No. 511,394. Patented Dec. 26, 1893.

Witnesses:
Curtis Lammond
Edwin L. Bradford

Joseph L. Yost  Inventor

By Wm. C. W. Intire
Attorney

UNITED STATES PATENT OFFICE.

JOSEPH L. YOST, OF TOLEDO, OHIO, ASSIGNOR TO THE YOST MANUFACTURING COMPANY, OF SAME PLACE.

BICYCLE-WHEEL.

SPECIFICATION forming part of Letters Patent No. 511,394, dated December 26, 1893.

Application filed December 12, 1892. Serial No. 454,871. (No model.)

*To all whom it may concern:*

Be it known that I, JOSEPH L. YOST, a citizen of the United States, residing at Toledo, in the county of Lucas and State of Ohio, have invented certain new and useful Improvements in Bicycles; and I do hereby declare the following to be a full, clear, and exact description of the invention, such as will enable others skilled in the art to which it appertains to make and use the same.

My invention relates to certain new and useful improvements in bicycles.

It has for its objects to provide a strong and light rim for the wheels, a pneumatic tire and valve which will render the structure as a whole strong and durable.

My invention consists of the peculiar construction, arrangement and combination of parts hereinafter described in detail and specifically claimed.

In order that those skilled in the art may know how to make and use my invention I will proceed to describe the same referring by letters of reference to the accompanying drawings, in which—

Figure 1:
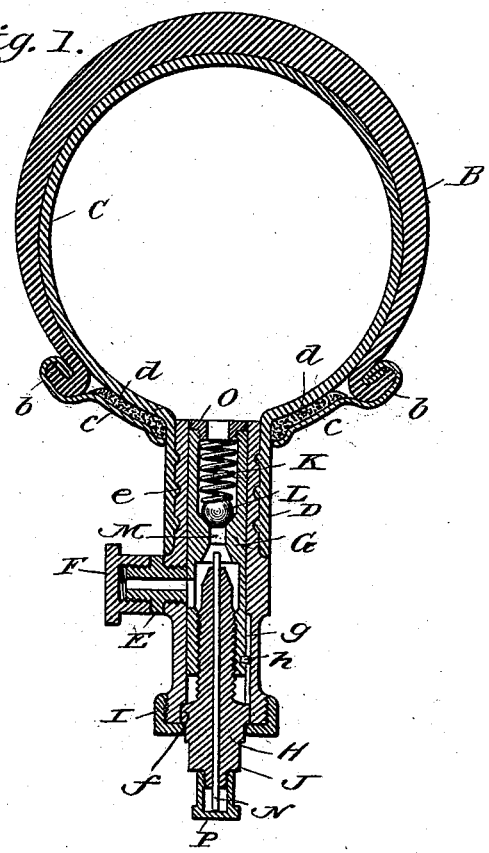
Figure 2:
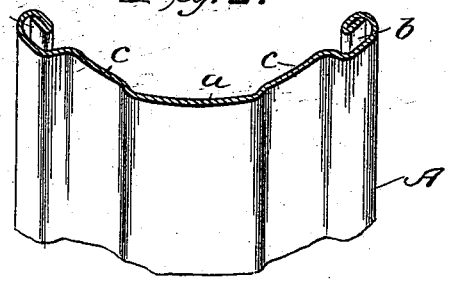

Figure 1 is a cross section of rim, tire and valve embodying the features of my invention; and Fig. 2 is a perspective view partially in section showing the form of the rim.

Similar letters of reference indicate like parts in both figures of the drawings.

A represents the rim constructed of suitable sheet steel rolled and stamped into the form most clearly shown at Fig. 2, so as to provide a depression or recess $a$ for the heads of the spoke nipples, said recess or corrugation also tending to give strength to the rim. The outer edges of the rim A are returned, as clearly shown, to form on each side a recess $b$, adapted to receive the edges of the outer covering B of the tire, and the recesses $a$ and $b$ bear such relation to each other that that portion of the rim designated by $c$ is adapted to receive and support a felt protecting strip $d$ which serves to prevent the inner inflatable tube C from chafing against the steel rim A. When the outer edges of the tire covering B are properly located within the recesses $b$ in the rim, while the inner inflatable tube C is deflated, all that becomes necessary to properly lock them in position is to inflate the tube C, the expansion of which binds the edges of the covering tightly in position as the returned edges of the rim form yielding or spring arms and at the same time confines the protecting felt strip $d$ in place. It will be seen that the edges of the outer covering B embrace the inwardly turned extreme edges of the rim A and are seated within the channel or groove formed by the return of the said edges, so that when the inner inflatable tube C is inflated, the pressure of the same will be such as to bind the outer covering between the tube C and the inwardly turned spring arms of the rim, and to in turn cause said arms to bind or grip the extreme edges of the outer covering against the inner surface of the opposite side of the rim, thus preventing the covering from withdrawing from its seat and also guarding against any creeping action. To remove the tire all that is necessary is to deflate the rubber tube C, whereupon the tire as a whole may be readily withdrawn from the rim A.

In order that the tube C may be inflated and deflated, I provide a valve secured within a short neck D, formed upon the tube C, and which is secured in place through the medium of interlocking corrugations $e$ formed on the exterior of the upper portion of the valve.

I will now proceed to describe the peculiarity of construction of the valve. The exterior or body portion is tubular in form and its upper end is secured by the corrugations, before described, in the neck D of the inner air tube C. At one side of the body a pump nipple E is secured in place by screw threading, and the outer end is closed by a screw threaded cap F. A central air passage is formed in the nipple E and communicates with the hollow interior of the valve body through a channel or slot in one side of a movable check valve carrier G, which is threaded interiorly at its lower end to receive a correspondingly threaded valve stem H, which is held in position within the valve tube or body by means of a screw threaded cap I between which and an annular recess or shoulder is embraced the annular projection $f$ of the valve stem so that the latter is free to be rotated by means of a wrench applied to the squared extremity J, and accordingly as the stem H is turned in one or the other direction the check valve carrier G is raised to open communication between the central channel of the pump nipple E and the slot in the side of the carrier, or lowered so that the solid portion of the body of the carrier shall bridge or close the central opening in the nipple to prevent leakage. To prevent the rotation of the carrier G and to insure its vertical movement by the rotation of the valve stem H, any suitable means may be employed such for instance as a groove $g$ and feather or pin $h$. The body of the carrier G is cored out to receive a coil spring K, and a check valve or ball L, which is provided with a short guiding neck M, adapted to be lifted by a vertically movable rod N arranged centrally within the valve stem H. The spring K is held in place in any suitable manner, but preferably by means of a screw threaded collar O, secured within the upper end of the carrier G in such manner that the spring K shall tend to keep the ball or check valve L in place, although of course the expansive force of the air within the tube C has a like effect. To inflate the tube C the valve stem H is rotated so as to cause the check valve carrier to move upward to uncover the air channel in the pump-nipple, and the cap F is then removed from the pump nipple E and the ordinary pump is applied in its place, and the air injected by the pump lifts the check ball or valve L, and enters the tube C. When the latter has been sufficiently inflated the valve stem H is rotated in a reverse direction so as to draw downwardly the carrier G until it has bridged or closed the air channel in the pump nipple. The pump is then removed and the cap F replaced as a greater security against leakage. To deflate the tube C, for any purpose, the cap N on the lower end of the valve stem H is removed, and the rod N is forced upwardly against the neck M of the check or ball L until it is lifted off its seat in the carrier G and against the action of the spring K, the carrier having been first raised so as to communicate with the air channel in the pump nipple E, and the cap F being removed, the air contained within the tube C is free to escape. The rod N is held in position and protected against accidental displacement by a cap P.

Having described the construction and mode of operation, what I claim as new, and desire to secure by Letters Patent, is—

1. The rim A formed with the nipple recess $a$ and having its edges returned as described to form spring arms, and the tire covering B having its edges turned within the seats formed by the return of the rim edges, and embracing the inner and outer surfaces of the extreme edge thereof, in combination with the inner inflatable tube C, substantially as hereinbefore set forth.

2. The combination of the rim A formed with recesses $a$, $b$, and felt seat $c$, the felt strips $d$, the tire covering B, and inflatable interior tube C, substantially as and for the purposes set forth.

3. In a valve for inflating the tube C, the body provided with a screw-threaded pump nipple E and interior movable check valve carrier G, provided with an air inlet, the rotatable valve stem H connected to the lower end of the carrier G, by screw threads and adapted to be rotated, substantially as and for the purpose set forth.

4. The check valve carrier G provided with an air inlet and recessed or hollowed out centrally, in combination with the check valve L, spring K and confining screw threaded collar O, substantially as and for the purpose set forth.

5. In combination with the check valve carrier G and ball valve L, the valve stem H provided with a movable ball operating rod N, substantially as and for the purpose set forth.

6. The valve stem H secured in position by the screw threaded cap I in the manner described, and provided with the rod N and protecting cap P, substantially as and for the purpose set forth.

In testimony whereof I affix my signature in presence of two witnesses.

JOSEPH L. YOST.

Witnesses:
W. F. DEWEY,
L. D. POWERS.